(12) United States Patent
Badger et al.

(10) Patent No.: US 8,010,465 B2
(45) Date of Patent: Aug. 30, 2011

(54) PREDICTING CANDIDATES USING INPUT SCOPES

(75) Inventors: Eric Badger, Issaquah, WA (US); Drew Elliott Linerud, Duvall, WA (US); Daryn Elliot Robbins, Issaquah, WA (US); Jason Michael Bower, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 12/037,637

(22) Filed: Feb. 26, 2008

(65) Prior Publication Data
US 2009/0216690 A1    Aug. 27, 2009

(51) Int. Cl.
G06F 17/00 (2006.01)
G06F 17/20 (2006.01)

(52) U.S. Cl. .......................................... 706/11
(58) Field of Classification Search ............... 706/11
See application file for complete search history.

(56) References Cited

U.S. PATENT DOCUMENTS

| | | | |
|---|---|---|---|
| 5,233,681 A | 8/1993 | Bahl et al. ........................... 395/2 |
| 5,390,281 A | 2/1995 | Luciw et al. ..................... 706/11 |
| 5,513,278 A | 4/1996 | Hashizume et al. ........... 382/187 |
| 5,623,406 A | 4/1997 | Ichbiah ........................... 395/753 |
| 5,936,614 A | 8/1999 | An et al. ........................ 345/173 |
| 5,956,423 A | 9/1999 | Frink et al. ..................... 382/187 |
| 6,003,050 A | 12/1999 | Silver et al. ..................... 715/205 |
| 6,167,376 A | 12/2000 | Ditzik ........................... 704/235 |
| 6,233,559 B1 | 5/2001 | Balakrishnan ................. 704/275 |
| 6,269,187 B1 | 7/2001 | Frink et al. ..................... 382/187 |
| 6,281,886 B1 | 8/2001 | Ranieri .......................... 345/173 |
| 6,356,866 B1 | 3/2002 | Pratley et al. ...................... 704/9 |
| 6,359,572 B1 | 3/2002 | Vale .................................. 341/23 |
| 6,401,067 B2 | 6/2002 | Lewis et al. .................... 704/275 |
| 6,415,256 B1 | 7/2002 | Ditzik ............................. 704/231 |
| 6,438,523 B1 | 8/2002 | Oberteuffer et al. .......... 704/270 |
| 6,456,978 B1 | 9/2002 | Wymore et al. ............... 704/275 |
| 6,552,719 B2 | 4/2003 | Lui et al. ........................ 345/179 |
| 6,581,033 B1 | 6/2003 | Reynar et al. ................. 704/231 |
| 6,594,390 B2 | 7/2003 | Frink et al. ..................... 382/187 |
| 6,654,038 B1 | 11/2003 | Gajewska et al. ............. 715/802 |
| 6,654,955 B1 | 11/2003 | Kusnitz et al. ................. 717/163 |
| 6,744,423 B2 | 6/2004 | Kraft .............................. 345/169 |
| 6,788,815 B2 | 9/2004 | Lui et al. ........................ 382/187 |

(Continued)

FOREIGN PATENT DOCUMENTS
EP       0565872 A2    10/1993
(Continued)

OTHER PUBLICATIONS

Notice of Allowance mailed Sep. 17, 2009, in U.S. Appl. No. 10/693,330.

(Continued)

*Primary Examiner* — Michael Holmes
(74) *Attorney, Agent, or Firm* — Merchant & Gould

(57) ABSTRACT

Embodiments are configured to provide one or more candidates based in part on an input identifier associated with an input interface. In an embodiment, a system includes an input method editor (IME) that can be configured to provide one or more candidates based in part on a prediction model and one or more input scope values associated with an input interface. The IME can also operate to store an entered string including one or more associated input scope values to a storage component. The stored information can be used when suggesting candidates.

17 Claims, 5 Drawing Sheets

U.S. PATENT DOCUMENTS

| | | | |
|---|---|---|---|
| 6,819,315 B2 | 11/2004 | Toepke et al. | 345/173 |
| 6,826,551 B1 | 11/2004 | Clary et al. | 706/46 |
| 6,970,599 B2 | 11/2005 | Longe et al. | 382/185 |
| 7,031,907 B1 | 4/2006 | Passaretti et al. | 704/2 |
| 7,043,700 B1 | 5/2006 | Bertram | 715/811 |
| 7,047,200 B2 | 5/2006 | Schmid et al. | 704/277 |
| 7,149,550 B2 | 12/2006 | Kraft | 455/566 |
| 7,207,011 B2 | 4/2007 | Mulvey | 715/812 |
| 7,251,667 B2 | 7/2007 | Atkin | 707/999.104 |
| 7,302,640 B2 * | 11/2007 | Lee et al. | 715/257 |
| 7,363,228 B2 | 4/2008 | Wyss et al. | 704/275 |
| 7,370,275 B2 | 5/2008 | Haluptzok et al. | 715/264 |
| 7,403,888 B1 * | 7/2008 | Wang et al. | 704/2 |
| 7,418,387 B2 * | 8/2008 | Mowatt et al. | 704/257 |
| 7,496,511 B2 | 2/2009 | Vora | 704/246 |
| 7,506,254 B2 * | 3/2009 | Franz | 715/259 |
| 7,584,188 B2 * | 9/2009 | Scriffignano et al. | 1/1 |
| 7,599,837 B2 | 10/2009 | Wang et al. | 704/257 |
| 7,634,720 B2 * | 12/2009 | Haluptzok et al. | 715/234 |
| 7,750,891 B2 * | 7/2010 | Stephanick et al. | 345/173 |
| 7,765,102 B2 * | 7/2010 | Mowatt et al. | 704/257 |
| 7,778,818 B2 * | 8/2010 | Longe et al. | 704/9 |
| 7,802,184 B1 * | 9/2010 | Battilana | 715/257 |
| 7,821,503 B2 * | 10/2010 | Stephanick et al. | 345/173 |
| 7,823,138 B2 * | 10/2010 | Arguelles et al. | 717/131 |
| 7,912,700 B2 * | 3/2011 | Bower et al. | 704/9 |
| 2002/0103881 A1 | 8/2002 | Granade et al. | 709/218 |
| 2002/0120647 A1 | 8/2002 | Amano | 715/234 |
| 2002/0178008 A1 | 11/2002 | Reynar | 704/272 |
| 2002/0198909 A1 | 12/2002 | Huynh et al. | 715/201 |
| 2003/0071850 A1 | 4/2003 | Geidl | 715/781 |
| 2003/0074647 A1 | 4/2003 | Andrew | 717/100 |
| 2003/0189603 A1 | 10/2003 | Goyal et al. | 715/863 |
| 2004/0044422 A1 | 3/2004 | Fux et al. | 700/17 |
| 2004/0111259 A1 | 6/2004 | Miller et al. | 704/243 |
| 2004/0225965 A1 | 11/2004 | Garside et al. | 715/531 |
| 2004/0243415 A1 | 12/2004 | Commarford et al. | 704/275 |
| 2005/0017954 A1 | 1/2005 | Kay | 345/169 |
| 2005/0086057 A1 | 4/2005 | Kosaka et al. | 704/251 |
| 2005/0091032 A1 | 4/2005 | Haluptzok et al. | 704/4 |
| 2005/0091037 A1 | 4/2005 | Haluptzok et al. | 704/9 |
| 2005/0136954 A1 * | 6/2005 | Itoh | 455/466 |
| 2005/0188330 A1 | 8/2005 | Griffin | 715/816 |
| 2005/0190970 A1 | 9/2005 | Griffin | 382/209 |
| 2006/0063558 A1 | 3/2006 | Scott | 455/550.1 |
| 2007/0016862 A1 | 1/2007 | Kuzmin | 715/700 |
| 2007/0089070 A1 | 4/2007 | Jaczyk | 715/816 |
| 2007/0226649 A1 | 9/2007 | Agmon | 715/816 |
| 2008/0208568 A1 | 8/2008 | Haluptzok et al. | 704/9 |
| 2008/0288243 A1 * | 11/2008 | Kobayashi | 704/9 |

FOREIGN PATENT DOCUMENTS

| | | |
|---|---|---|
| EP | 0689155 A2 | 12/1995 |
| EP | 0841655 A2 | 5/1998 |
| EP | 1077404 A2 | 2/2001 |
| EP | 1091303 A2 | 4/2001 |
| EP | 1143334 A2 | 10/2001 |
| EP | 1256875 A | 11/2002 |

OTHER PUBLICATIONS

Office Action mailed Sep. 1, 2010, in U.S. Appl. No. 12/115,427.

Dunlop, M.D., et al., "Predictive Text Entry Methods for Mobile Phones," 2000, The University of Strathclyde in Glasgow, p. 1-10, http://eprints.cdlr.strath.ac.uk/2580/01/dunlopcrossan_predictivetext.pdf.

Clemens, Dirk, et al., "Individually Assisted Text Entry with Situational and Contextual Prediction," 2002, Embassi Project, p. 1-3, http://www.embassi,de/publi/veroeffent/Clemens-Heck.pdf.

Li, Jianhua, et al., "Semantic Knowledge in Word Completion," 2005, Department of Computer Science—University of Toronto, p. 1-8, http://www.cs.toronto.edu/pub/gh/Li+Hirst-2005.pdf.

Citrin et al., "Distributed Architectures for Pen-Based Input and Diagram Recognition," 11 pages, ACM Conference on Advanced Visual Interface '96.

EP Search Report, mailed Jul. 4, 2007 for EP Application No. 04021626, 3 pages.

Tsai et al., "Command Management System for Next Generation User Input," IEEE, 1999, pp. 1-6.

USPTO Office Action dated Jun. 21, 2007 in connection with U.S. Appl. No. 10/693,330.

USPTO Office Action dated May 14, 2008 in connection with U.S. Appl. No. 10/693,330.

USPTO Office Action dated Jan. 5, 2009 in connection with U.S. Appl. No. 10/693,330.

USPTO Office Action dated Apr. 17, 2007 in connection with U.S. Appl. No. 10/850,844.

USPTO Office Action dated Jul. 13, 2007 in connection with U.S. Appl. No. 10/850,844.

USPTO Notice of Allowance dated Jan. 24, 2008 in connection with U.S. Appl. No. 10/850,844.

\* cited by examiner

PREDICTING CANDIDATES USING INPUT SCOPES

BACKGROUND

Computing devices, including handheld mobile devices, have become essential tools for both business and personal uses. The size and portability of handheld mobile devices make them particularly attractive to users. Advances in computing power and storage capacity have made handheld computing devices even more attractive. However, the limited size of some input controls and displays can adversely affect the user experience. For example, handheld devices tend to have input devices with small form factors that can be awkward to use, such as a 12-key keypad or T9 type interface. Correspondingly, it may be more difficult and require more time to manually enter inputs due in part to the type of input device. Text prediction methods have been developed to try and reduce the amount of manual input required by application users, including handheld applications users.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide one or more candidates based in part on an input identifier associated with an input interface. In an embodiment, a system includes an input method editor (IME) that can be configured to provide one or more candidates based in part on a prediction model and one or more input scope values associated with an input interface. The IME can be further configured to store an entered string including one or more associated input scope values to a storage component. The stored information can be used when suggesting candidates.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are configured to provide one or more candidates based in part on an input identifier associated with an input interface. In an embodiment, a system includes an input method editor (IME) having a prediction component that can be configured to provide one or more potential candidates based in part on a prediction model. The IME can refine the prediction by presenting one or more candidates based in part on one or more input scope values associated with an input interface. For example, a computing device can include the IME for use across applications executing on the computing device.

The IME can be further configured to store an entered string including one or more associated input scope values to a storage component. The stored information can be used when predicting future candidates based in part on an input scope value or values associated with a particular input interface. The IME can be used in conjunction with a variety of applications, input methods and types. For example, the functionality of the IME can be used with text-based applications having keyed input controls, handwritten-based or inking applications, speech-based applications, and other applications that can be configured to receive user input. The functionality of the IME can also be used with multiple languages.

In one embodiment, a mobile computing device includes an IME application having executable instructions that can be executed to present one or more candidates as part of a candidate window that is associated with an input interface. The IME application can operate to predict the one or more candidates based in part on a prefix matching determination using input history data and an input scope value associated with the input interface of an application. The IME application can operate to store user input including an associated input scope to an input history buffer or other memory. The IME application can be used with different input types, such as handwritten input, speech input, typed input, or some other type of input.

In another embodiment, a software application can be configured to provide one or more candidates based in part on an input scope value or values across a plurality of disparate applications. The software application can operate to determine a word, phrase, or other string that a user is attempting to input into one or more of the disparate applications to assist the user to input the information faster and with less effort. The software application can be installed on a computing device and used to provide text prediction, handwriting prediction, vocalized prediction, and other types of candidate prediction. The software application can be used to suggest one or more candidates based in part on user input, such as typed input, spoken input, or handwritten input for example.

Figure 1:
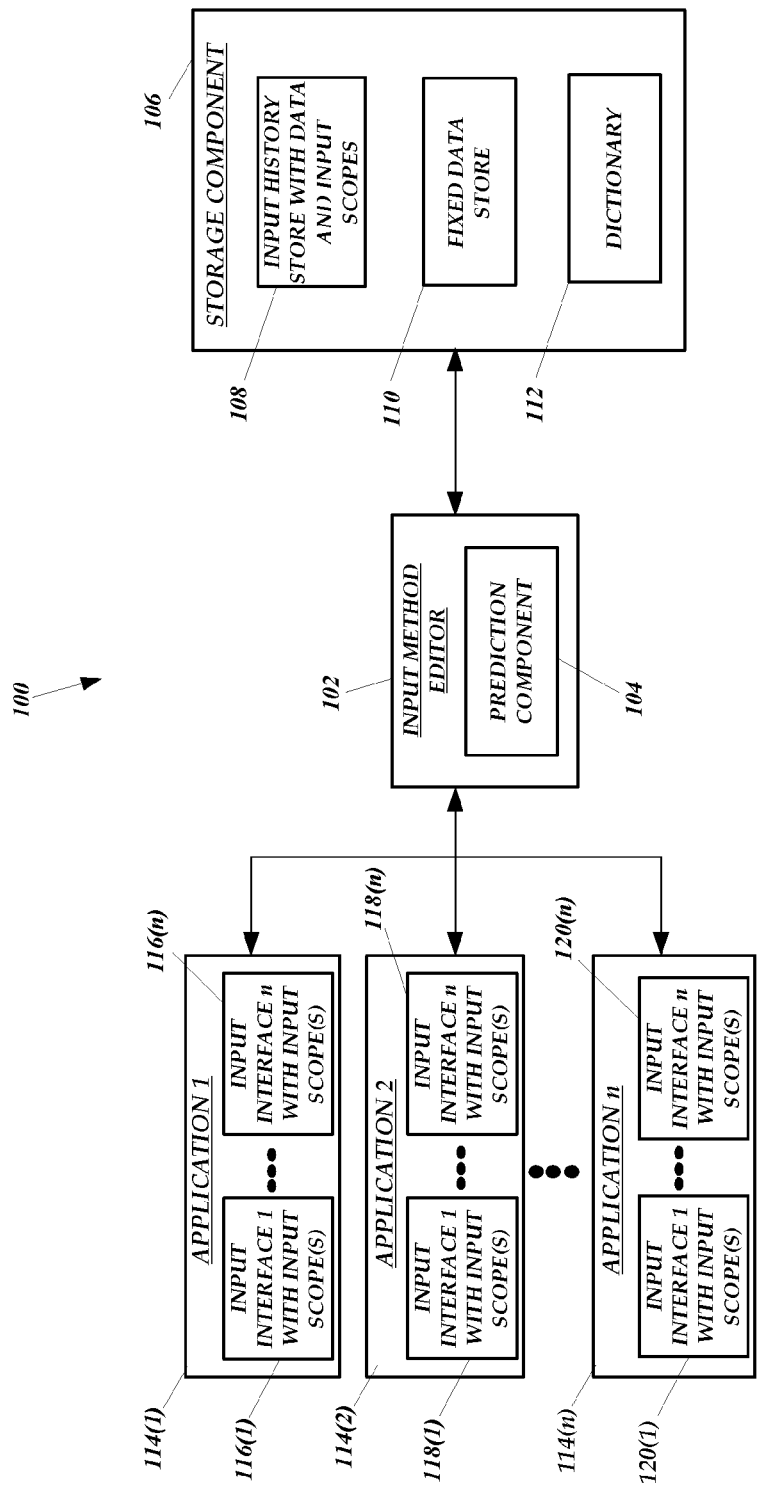
FIG. 1 is a block diagram of an example system to provide information.

FIG. 1 is a block diagram of a system 100, according to an embodiment. As described below, components of the system 100 can be configured to provide one or more candidates based in part on an input identifier associated with an input interface. For example, the system 100 can operate to present strings, such as words, phrases, compound words, acronyms, number sequences, and/or other information representations to a user based in part on the user's input, such as handwritten, spoken, typed, or another type of input. The system 100 can be used with various types of inputs, including different language models and input methods. As described below, in various embodiments, one or more input scope values can be associated with an input interface, such as an input field or editable control that is configured to receive a user's input. For example, an input field of an application can be tagged with one or more input scope values which can be used when providing one or more candidates to a user.

As shown in FIG. 1, the system 100 includes an input method editor (IME) 102 that can operate to provide one or more candidates based in part on an input scope associated with an input interface of an application or other component. For example, the IME 102 can be used in conjunction with a number of applications running on a computing device to predict and suggest one or more words or other strings to a user based in part on an input scope value assigned to an input field of an application. The IME 102 includes a prediction component 104 that can be used to predict one or more potential candidates as part of an input operation, but the prediction component 104 is not so limited.

In an embodiment, the prediction component 104 includes a prediction model or algorithm that can be used to predict candidates based in part on user input to an editable field of an application. For example, the prediction component 104 can operate to return one or more potential candidates, such as candidate strings, based in part on an associated predictive probability which can include usage frequency parameters, statistical parameters, n-gram and/or other probability models, etc.

In one embodiment, the prediction component 104 includes an input history candidate provider (IHCP) that can operate to predict candidates using a prefix matching determination to identify candidates by matching one or more input characters with strings that are stored in the storage component 106. The IME 102 can further refine candidates to be presented to a user by using one or more input scope values to filter the predicted or potential candidates provided by the prediction component 104. In another embodiment, the prediction component 104 can include the refining or filtering functionality of the IME 102.

The system 100 also includes a storage component 106, such as a memory or other storage device. The storage component 106 can be a local store, a remote store, or some combination thereof for storing information. For example, the storage component 106 can include random access memory (RAM), read-only memory (ROM), flash memory, and/or some other type of memory. As shown in FIG. 1, the storage component 106 includes an input history store 108, a fixed data store 110, and a dictionary 112. In one embodiment, the fixed data store 110 includes one or more fixed data sets that include data that does not change, such as month names, weekday names, etc. An input scope value or values can be associated with certain input interfaces to identify fixed data types so that the IME 102 can use the fixed data store 110 when suggesting candidates. In one embodiment, the dictionary 112 includes statistical information associated with a probability of certain words appearing in proximity to other words.

The input history store 108 includes input history data and input scope information associated with the input history data. In one embodiment, the input history store 108 includes data, such as strings for example, that a user has previously entered or selected from a candidate list, but is not so limited. The input history store 108 can also include statistical information regarding the probability of one string appearing in proximity to another string. A string can refer to a sequence of one or more alphanumeric characters and/or symbols including words, compound words, phrases, Internet addresses, email addresses, telephone numbers, passwords, credit card numbers, street addresses, etc.

The input scope information can be stored with the input history data to identify a data type or input type that can be used when filtering predicted candidates, but is not so limited. Moreover, input scope information can also be preconfigured for the static dictionary data. In one embodiment, an input scope value (see Table 1 below) can be stored in the input history store 108 with each entered string to identify a data type or input type that can be used when providing one or more candidates to a user. For example, the IME 102 can use an application programming interface (API) to identify an input scope value that is associated with an input field of an application, wherein the IME 102 can store the identified input scope value with associated data in the input history store 108.

Moreover, an identified input scope value can be used to refine or filter predicted or potential candidates provided by the prediction component 104, so that the most relevant candidates are presented to the user based in part on an associated input scope value. In one embodiment, the input history data can be stored separately from the input scope information and pointers or links can be used to associate certain data with one or more input scopes. In another embodiment, the input history store 108 can include input scope containers that include input history data, wherein each input scope container includes a data set of input data associated with the particular input scope.

As described below, an input scope value can be used when suggesting one or more strings or candidates from the input history store 108. For example, the IME 102 can operate to suggest one more candidates to a user which have an input scope value that is the same as the input scope value that is associated with the input interface that a user is currently using to enter some string. The IME 102 can also operate to check the dictionary 112 and/or fixed data store 110, when appropriate, to identify one or more candidates that match a given prefix that the user has typed so far if the IME 102 does not find enough candidates in the input history store 108 to fill a candidate suggestion interface with a designated number of candidates. The IME 102 can add any additional candidates to the candidate suggestion interface until the maximum number of candidates allowed to be presented is reached.

However, if a default input scope value is associated with an input interface, the IME 102 can operate to provide one or more candidates from the input history store 108 without limiting to a particular input scope value. That is, when a default value is associated with a current input interface being used by a user to input one or more characters (i.e., the input interface has focus), the IME 102 operates to provide one or more candidates using the input history data, with certain exceptions, from the input history store 108 and static data from the dictionary 112, based in part on the user input. In some cases, the IME 102 can operate to exclude certain candidates or all candidates associated with certain input scope values from being suggested that may not make sense in the current context. For example, the IME 102 can be configured to exclude candidates tagged with an input resource locator (URL) input scope value when a user is entering text in an email message body that includes a default value.

According to one embodiment, the following input scope values shown in Table 1 can be used to identify an input scope, such as a data type or input type for example:

TABLE 1

| Input Scope | Description | Value |
| --- | --- | --- |
| IS_DEFAULT | Default type | 0x0000 |
| IS_URL | Uniform Resource Locator | 0x0001 |
| IS_FILE_FULLFILEPATH | File path | 0x0002 |
| IS_FILE_FILENAME | File name | 0x0003 |
| IS_EMAIL_USERNAME | Email username | 0x0004 |

TABLE 1-continued

| Input Scope | Description | Value |
|---|---|---|
| IS_EMAIL_SMTPEMAILADDRESS | SMTP email address | 0x0005 |
| IS_LOGINNAME | User login name | 0x0006 |
| IS_PERSONALNAME_FULLNAME | User full name | 0x0007 |
| IS_PERSONALNAME_PREFIX | User name prefix | 0x0008 |
| IS_PERSONALNAME_GIVENNAME | User given name | 0x0009 |
| IS_PERSONALNAME_MIDDLENAME | User middle name or initial | 0x000A |
| IS_PERSONALNAME_SURNAME | User surname | 0x000B |
| IS_PERSONALNAME_SUFFIX | User name suffix | 0x000C |
| IS_ADDRESS_FULLPOSTALADDRESS | Complete postal address | 0x000D |
| IS_ADDRESS_POSTALCODE | Zip code | 0x000E |
| IS_ADDRESS_STREET | Street address | 0x000F |
| IS_ADDRESS_STATEORPROVINCE | State or Province | 0x0010 |
| IS_ADDRESS_CITY | City | 0x0011 |
| IS_ADDRESS_COUNTRYNAME | Country | 0x0012 |
| IS_ADDRESS_COUNTRYSHORTNAME | Country abbreviated | 0x0013 |
| IS_CURRENCY_AMOUNTANDSYMBOL | Currency amount and symbol | 0x0014 |
| IS_CURRENCY_AMOUNT | Currency amount | 0x0015 |
| IS_DATE_FULLDATE | Full date (month, day, year) | 0x0016 |
| IS_DATE_MONTH | Month (numerical) | 0x0017 |
| IS_DATE_DAY | Day (numerical) | 0x0018 |
| IS_DATE_YEAR | Year (numerical) | 0x0019 |
| IS_DATE_MONTHNAME | Month name | 0x001A |
| IS_DATE_DAYNAME | Day name | 0x001B |
| IS_DIGITS | Digit | 0x001C |
| IS_NUMBER | Number | 0x001D |
| IS_ONECHAR | Single character | 0x001E |
| IS_PASSWORD | Password | 0x001F |
| IS_TELEPHONE_FULLTELEPHONENUMBER | Full telephone number | 0x0020 |
| IS_TELEPHONE_COUNTRYCODE | Country code | 0x0021 |
| IS_TELEPHONE_AREACODE | Area code | 0x0022 |
| IS_TELEPHONE_LOCALNUMBER | Local telephone number | 0x0023 |
| IS_TIME_FULLTIME | Time | 0x0024 |
| IS_TIME_HOUR | Hour | 0x0025 |
| IS_TIME_MINORSEC | Minutes or seconds | 0x0026 |
| IS_NUMBER_FULLWIDTH | Number | 0x0027 |
| IS_ALPHANUMERIC_HALFWIDTH | Alphanumeric | 0x0028 |
| IS_ALPHANUMERIC_FULLWIDTH | Alphanumeric | 0x0029 |
| IS_CURRENCY_CHINESE | Chinese currency | 0x002A |
| IS_BOPOMOFO | Mandarin type | 0x002B |
| IS_HIRAGANA | Japanese type | 0x002C |
| IS_KATAKANA_HALFWIDTH | Japanese type | 0x002D |
| IS_KATAKANA_FULLWIDTH | Japanese type | 0x002E |
| IS_HANJA | Chinese type | 0x002F |
| IS_YOMI | Japanese type | 0x0030 |

With continuing reference to FIG. 1, the system 100 also includes a number of applications 114(1)-114(n) (where n=0, 1, 2, ...). One or more of the applications 114(1)-114(n) can be resident on an associated computing device, such as a handheld device, and/or other applications can be accessed remotely across one or more networks or other communication means. Application 114(1) includes input interfaces 116(1) through 116(n), Application 114(2) includes input interfaces 118(1) through 118(n), and Application 114(n) includes input interfaces 120(1) through 120(n). For example, applications 114(1) and 114(2) may correspond to a web-based search engine application and an email application respectively, while application 114(n) may correspond to a web-based banking application.

As shown in FIG. 1, each one of the respective input interfaces can include one or more associated input scope values. That is, a plurality of input scope values can also be assigned to a particular input interface, as described below. For example, an input interface, such as an input field, may direct a user to enter a city, state, a zip code, and a country, wherein associated input scope values can be assigned or tagged to the input field. Correspondingly, input scope values can be associated with the input interface and used to provide one or more candidates to the user for selection, which can reduce the amount of input operations required by the user.

In an embodiment, the IME 102 can operate to provide one or more candidates associated with an input interface having a plurality of input scope values associated therewith. Input from such an interface can be used to provide one or more candidates in other input interfaces that include the same set of input scope values or a superset of the input scope values included in the original interface. When a user enters a string into an input interface, the IME 102 can operate to store multiple input scope values per string entry and tag the associated input data with each of the input scope values associated with the input interface. Thereafter, when suggesting one or more candidates as part of an input to an input interface having a plurality of input scope values, the IME 102 can determine whether the input scope values associated with a potential candidate are the same as or a subset of the input scope values of the associated input interface currently being used.

For example, consider an input field that has been tagged with a "city" input scope value and with a "state" input scope value. That is, the input field has been configured to receive inputs associated with city or state names. If a user enters the word "Idaho" in this input field, the IME 102 can operate to store the string in the input history store 108 with the city input scope value and the state input scope value. "Idaho" would then be provided as a suggested candidate when a user subsequently enters one or more prefix matching characters in an input field that includes the "city" and "state" input scope values or a superset of these values (e.g., input field includes "city", "state", and "country" input scope values). In an alternative embodiment, the IME 102 can operate to store an entered string multiple times for each associated input scope value associated with a multi-valued input field.

For the example above, the IME 102 can store the string "Idaho" twice; once with a city input scope value and again with a state input scope value. The two "Idaho" entries can be linked together to avoid presenting "Idaho" as a candidate for "City" input fields, or for "State" input fields (note that we should not present "Idaho" for "State" fields because we do not actually know whether the entry is meant to indicate a city or a state). The linking can be accomplished by including a pointer with each entry. The first entry should include a pointer to the second entry, the second entry should include a pointer to the third entry, and so on, until the last entry which should include a pointer linking back to the first entry. When the entries are so linked, they will form a circular linked list of entries within the input history store 108. The IME 102 can then traverse this circular list to identify the set of input scopes that were defined for the input interface where the word was entered. Using this information, the IME 102 can operate to suggest the string "Idaho" in "City or State" or "City or State or ZIP" input fields.

In one embodiment, once a user has entered a string (e.g., clicked a button to enter the string in an associated input field, tabbed to a different input field, etc.) or selected a candidate from a candidate window (e.g., used a stylus to tap and select a candidate, etc.) associated with an input interface having a plurality of input scopes, the IME 102 can operate to store the entered string or selected candidate to the input history store 108 with a default input scope value. In another embodiment, the IME 102 can operate to store the entered string or selected candidate to the input history store 108 with each of the input scope values associated with the input interface, as described above. For example, the IME 102 can operate to store a selected candidate as: "selected candidate AND (input scope value 1 or input scope value 2 or input scope value 3)".

In an embodiment, the IME 102 can operate to present candidates from the input history store 108 which have any of a plurality of input scope values associated with an input interface currently being used as part of refining a prediction of potential candidates predicted by the prediction component 104. Accordingly, the IME 102 can operate to present candidates that are most likely relevant to what the user is attempting to enter in the current input interface. For example, assume that an input field has been tagged with a "city" input scope value and a "state" input scope value. That is, the input field has been assigned two input scope values, wherein each of the input scope values can be used to present predicted candidates.

When presenting candidates to the user, the IME 102 can operate to present or suggest candidates from the input history store 108 that include either city or state names that match the text entered so far in the input field. Continuing this example, a user might enter "S" and the IME 102 can operate to present a city, such as "Seattle", and a state, such as "South Dakota", as candidates in a candidate window or other selection interface associated with the input field. The user can select a presented candidate or can enter a different string according to the particular situation. The IME 102 can store the selected candidate and/or update a probability associated with the selected candidate, or entered string along with the associated input scope value or values to the input history store 108.

As described above, as a user enters one or more characters of an undetermined input stream or string in an input interface, the IME 102 uses the prediction component 104 to predict potential candidates, such as a string or strings. The potential candidates can be further refined by using an input scope value or values to limit which candidates are ultimately presented to the user. For example, the IME 102 can operate to present relevant candidates while limiting the presentation of irrelevant candidates by using one or more input scope values as a refinement tool, which can reduce the number of input operations required by the user.

Correspondingly, the IME 102 can assist the user when entering a string or strings by reducing the amount of keystrokes, pen strokes, or other inputs as part of an input operation. For example, the IME 102 can use the prediction component 104 to predict one or more potential words or numerical strings based on a prefix match against what text the user has entered so far into an input field and/or other statistical information stored in the input history store 108. As another example, a user, using handwritten input, can tap the display to select a word presented by the IME 102 based in part on one or more handwritten inputs and an associated input scope value, which can result in a reduction of the amount of pen strokes required to enter a desired word.

In an alternative embodiment, the IME 102 can operate to present one or more candidates to a user without any user input as long as the input interface is in focus (e.g., the cursor is in an input field). In this embodiment, the IME 102 can present one or more candidates based on an input scope value or values associated with the input interface. For example, the IME 102 can automatically suggest first names from the input history store 108 when a user places a cursor in an input field having a first name input scope value.

According to an embodiment, in addition to suggesting candidates as part of entering a string into one input interface, a grouping of such input interfaces can be tagged as a class. For example, a Name and Address class can use the input of several fields such as First Name, Last Name, Street Address, City, State, Zip Code and Country which can be grouped and saved together. The grouping can be referred to an input scope class. An input scope class can be used to auto complete forms that are asking for the same or similar sets of data.

An example of this retrieval would be when filling out a webpage requesting the Name and Address of an individual. When a user starts typing in the First Name input field, the IME 102 can operate to present a predicted first name along with all of the associated data for each field of the input scope class. When such a candidate is selected, the IME 102 can operate to automatically populate the Last Name, Street Address, City, State, Zip Code, and Country fields with the data associated with the input scope class. Correspondingly, the amount of time required to enter data for multiple fields of an associated input class can be reduced. Moreover, the number of data input operations are also reduced as compared to having to enter data into each field one at a time.

In one embodiment, a database component can be included with the storage component 106 and used to track input scope classes and instances of the input scope classes that have previously been entered. An instance of an input scope class can consist of a set of strings, wherein the number of strings is equal to the number of input scope values that define the input scope class. Each string corresponds to one of the input scope values. For example, the database of input scope classes and associated instances can be used when suggesting one or more candidates, including automatically completing the input fields with suggested candidates, such as for forms which contain multiple input fields, wherein each input field has a unique input scope value.

As one example, assume that there is only one input scope value associated with each input field of a form which contains a plurality of input fields. An input scope class can be defined by the set of input scope values associated with the plurality of input fields for the form. Changing the order of the input scope values does not change the definition of the class. Table 2 below provides an example of a "first name, last name, city, state" input scope class and two instances of such as class.

TABLE 2

| InputScope Class Definition | InputScope Class Instance 1 | InputScope Class Instance 2 |
|---|---|---|
| IS_PERSONALNAME_GIVENNAME | "John" | "Jane" |
| IS_PERSONALNAME_SURNAME | "Doe" | "Smith" |
| IS_ADDRESS_CITY | "Reardon" | "Tacoma" |
| IS_ADDRESS_STATEORPROVINCE | "Washington" | "Washington" |

In an embodiment, an application can register a class with the system 100 to enable input scope class prediction for an associated form or other interface. An API can be used to pass a list of edit controls or input fields associated with an input scope class for the application. Thereafter, the IME 102 can use an API to obtain input scope values associated with edit controls or input fields. The IME 102 can identify the input scope class using the obtained input scope values for the edit controls or fields. When one of the edit controls or fields in the form subsequently receives focus, the IME 102 can operate to identify that the control or field is a member of a registered input scope class.

Assuming the sample input scope class shown in Table 2, and that a user entered "J" in the "first name" field of the form. As part of the suggestion functionality, the IME 102 can present the user with a prediction candidate that would include all of the strings in "Instance 1" of the input scope class of Table 2. The IME 102 can operate to identify candidates of input scope classes that are a logical superset of a target input scope class. In most cases, a subset of each instance of these classes, if they exist in the database component, will correspond to a valid instance of the target input scope class. The IME 102 can also present additional, single-word candidates from the input history store 108 as described above. If the user selects "John, Doe, Reardon, Wash." from the candidate list, the IME 102 can operate to populate all four fields of the form that map to each field of the associated input scope class.

When the user submits the form, and if the class instance is new, the IME 102 can operate to save the new instance of the input scope class to the database component. If the new instance matches an existing instance (i.e. the instance is not really new), the IME 102 can ignore the instance without a store operation. In another embodiment, an application can be configured to specify a subset of input scope values belonging to an input scope class and a format string to use when displaying candidates as part of the registration of an input scope class with the system 100. As an example, the IME 102 can then operate to present candidates as "John Doe" instead of "John, Doe, Reardon, Wash.".

As described above, components of the system 100 can also be used to predict and suggest candidates for other types of input methods. In an embodiment, the IME 102 can be used to improve accuracy for Speech Recognition (SR), by restricting or weighting SR grammars that are associated with input controls that are tagged with input scope values. The grammars can be weighted or restricted to favor words that had previously been entered in fields tagged with the same input scope values.

For example, consider a speech grammar set on an input control that includes the names Don and Tom. These names can be difficult for a speech recognition engine to differentiate. However, if the input control is tagged with the IS_PERSONALNAME_GIVENNAME input scope value, and the user has entered Tom (and not Don) in other input controls tagged with this input scope value, then the IME 102 can operate to suggest Tom as a more likely candidate and weight the grammar in favor of this name. Correspondingly, the IME 102 can use the input scope values and weighting or restriction operations to reduce misrecognitions of spoken inputs (e.g., Tom as Don (a substitution error)).

Various devices, systems, and interfaces, such as QWERTY keyboard devices, 12-key devices, and other input devices can use the aforementioned functionality to provide one or more suggested candidates based in part on a user input, such as one or more input characters. For example, for a 12-key device, when a user presses "2", the user may be attempting to input a string that begins with an "A", "B", or a "C". Multiple key presses can result in more potential combinations. For example, "227" could be the prefix "car", "bar", "cap", etc. By associating an input scope identifier with an input field or other interface, the potential candidates can be limited accordingly. For example, if a user is tying "227" into a zip code field using a 12-key device, the IME 102 will only present numeric strings since a zip code input scope value is associated with the input field.

As described above, components of the system 100 can be used to present or suggest one or more candidates based in part on an input identifier in the context of one or more applications, including email applications, browsing applications, texting applications, inking applications, application with forms to be submitted, speech-based applications, and/or some other application or implementation. For example, components of the system 100 can operate to predict words, number sequences, alphanumeric sequences, phrases, and other strings or sequences based in part on handwritten input, typed input, speech input, and/or other types of input in conjunction with an input scope value or values. One or more candidates can be displayed on a user device, such as a laptop, desktop, smart phone, or other computing or communication device.

Components of system 100 described above can be implemented as part of networked, distributed, and/or other computer-implemented and communication environments. The system 100 can be employed in a variety of computing environments and applications. For example, the system 100 can used with computing devices having networking, security, and other communication components configured to provide communication functionality with other computing and/or communication devices. Such computing devices include desktop computers, laptop computers, tablet computers, handheld devices (e.g. smart phone, personal data assistant (PDA), ultra-mobile personal computer, etc.), and/or other devices and systems.

The embodiments described herein can be used with a number of applications, systems, and other devices and are not limited to any particular implementation or architecture. Moreover, certain components and functionalities can be implemented either in hardware or software. While certain embodiments include software implementations, they are not so limited and they encompass hardware, or mixed hardware/ software solutions. Also, while certain data structures, component features, and predictive functionality has been described herein, the embodiments are not so limited and can include more complex data structures, features, and other functionality. Accordingly, the embodiments and examples described herein are not intended to be limiting and other embodiments are available.

Figure 2A:
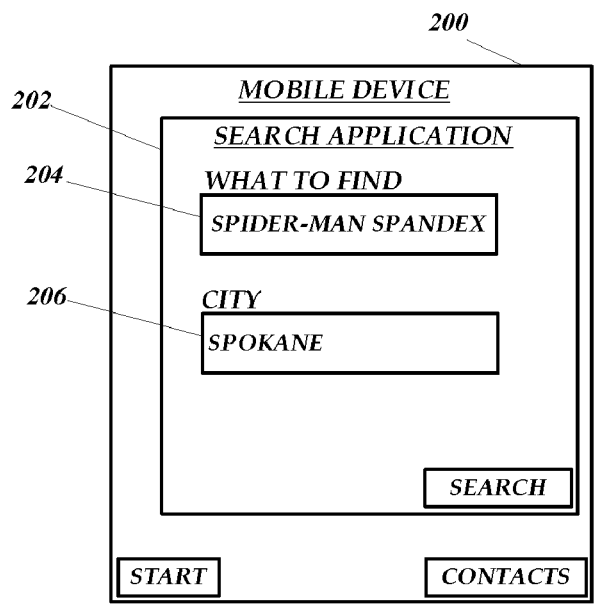
FIGS. 2A and 2B depict an example of a computing device illustrating a presentation of one or more suggested candidates.
Figure 2B:
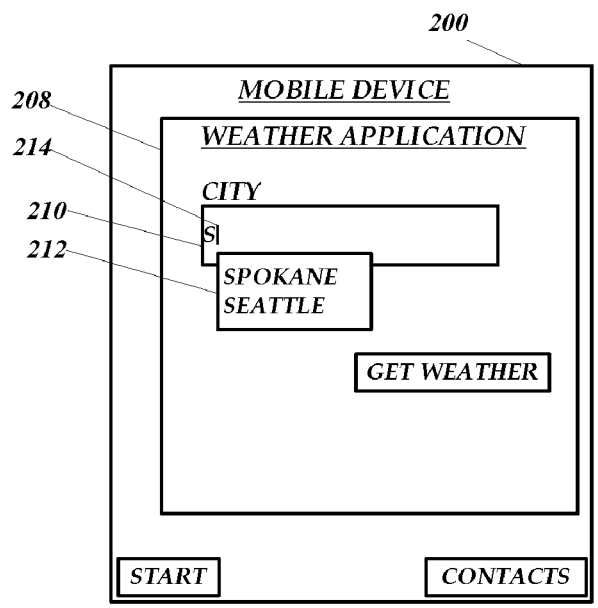

Referring now to FIGS. 2A and 2B, an example of using one or more input scope values to present one or more candidates to a user is shown. A display 200 of a mobile computing device is shown in FIGS. 2A and 2B. As shown in FIG. 2A, a user is using a search application 202 to search the web for some information. In this example, the user has entered the text "Spider-man Spandex" in a search window 204 having a default input scope attribute and associated value and a city "Spokane" in a city window 206 having a city input scope attribute and associated value. After entering the text, the IME 102 operates to store the strings "Spider-man" and "Spandex" with default input scope values, and the string "Spokane" with the city input scope value to the input history store 108.

Next, as part of a subsequent search, the user enters the text "Salty Seafood" in the search window 204 and "Seattle" in the city window 206 of the search application 202 and executes the search. The IME 102 has stored the strings "Salt" and "Seafood" with default input scope values, and "Seattle" with the city input scope value to the input history store 108. For this example, the input history store 108 now includes six strings which begin with the letter "S". Moreover, Seattle and Spokane were stored with an input scope value corresponding to the city attribute due to the associated city window 206 tag and the remaining words were stored with an input scope value corresponding to the default attribute due to the associated search window 204 tag. While the words are stored as unitary strings, the IME 102 can also store data as phrases, classes, and other data structures.

As shown in FIG. 2B, the user is now using a weather application 208 to determine weather information associated with a city. While one application is shown in FIGS. 2A and 2B, the applications may both be open at the same time, and the mobile device may also have other applications open and/or running. For this example, the user has entered the letter "S" into a city window 210 which also includes the city input scope attribute and associated value. The cursor 214 illustrates that the city window 210 has focus and the user has not yet entered a complete word or selected a candidate.

As part of the suggestion process and using the input character "S", the IME 102 uses the prediction component 104 to provide two potential candidates, "Spokane" and "Seattle", in a candidate window 212 based in part on a prefix matching determination against input data of the input history store 108 having the city input scope value. As described above, the prediction component 104 can also be configured to operate with a different type of predictive functionality. For example, the prediction component 104 can include a candidate provider to return a potential candidate based on a probability model and/or statistical data, such as usage frequency, n-gram models, temporal data, etc.

Since the other strings having the default input scope values are not considered for prediction, the amount and time of processing can be reduced while increasing the speed at which candidates are ultimately presented to the user. If an input scope value was not used to refine the potential candidates, and assuming that the candidate window was configured to display only four candidates, the IME 102 may not have presented "Spokane" due to the five other words beginning with 's' that had recently been added to the input history store.

Figure 3:
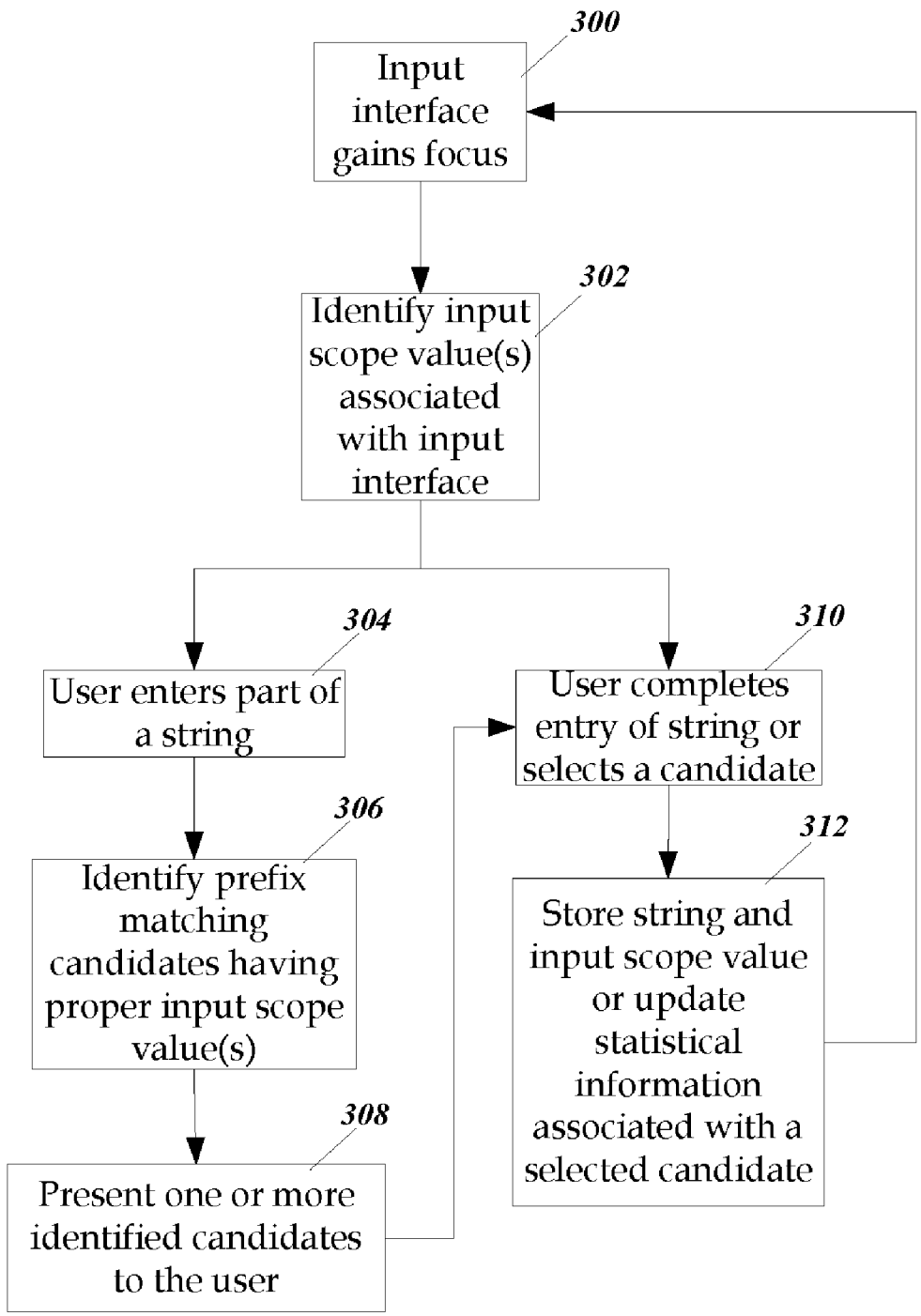
FIG. 3 is a flow diagram illustrating an example of providing information based in part on an input identifier.

FIG. 3 is a flow diagram illustrating a process of presenting one or more candidates to a user based in part on an input identifier associated with an input interface, under an embodiment. The components of FIG. 1 are used in describing the flow diagram, but the embodiment is not so limited. At 300, a user interacts with an input interface with the intention of entering a particular string. As described above, one or more input interfaces can be associated with an application to receive user input. For example, a mobile device user can activate an input control by clicking on the control which, when activated, is configured to receive the user's input, including handwritten, spoken, typed, tapped, pressed, and other input types according to the device functionality.

At 302, the IME 102 can operate to identify an input identifier that is associated with the input interface currently in use. In one embodiment, the IME 102 can use an API to identify an input scope value or values associated with the input interface, such as an input control or field for example. An API can also be used to associate, modify, or remove one or more input scopes associated with an input interface. For example, a user, such as an application developer, can use the API to tag a selected input field or control with one or more input scope values. An API can also be used to identify an input scope class associated with a plurality of input fields. Besides using an API to tag a selected input field, fields can also be assigned one or more input scope values in a resource or similar configuration file.

At 304, the user can use an input device, such as a keyboard, microphone, keypad, stylus, or other input device to enter a part of a string, such as one or more alphanumeric or other characters, into the input interface. As described above, the IME 102 can also operate to automatically present one or more candidates absent any input by the user based in part on the input scope value or values associated with the particular input interface in use and input history data stored in the storage component 106.

At 306, the IME 102 uses the prediction component 104 to identify one or more prefix matching candidates having the proper input scope value or values using the input history data stored in the storage component 106. In one embodiment, the IME 102 can first use the prediction component 104 to identify any prefix matching candidates using the input history data stored in the storage component 106. Thereafter, the IME 102 can operate to filter any prefix matching candidates according to the input scope value or values identified at 302 and only present prefix matching candidates having the proper input scope value or values.

In another embodiment, the IME 102 can be configured to first filter the input history data according to the input scope value or values identified at 302 and then use the prediction component 104 to identify prefix matching candidates from the filtered data for an appropriate input scope value or values. Thereafter, the IME 102 can present one or more prefix matching candidates having the proper input scope value or values to the user. In other embodiments, the prediction component 104 can be configured to predict one or more candidates using a different type of prediction or statistical model, as described above. The IME 102 can also identify one or more candidates using data from the fixed data store 110 and/or dictionary 112 if there is no input scope assigned to the current input interface or if the current input interface has a default input scope value associated therewith.

At 308, the IME 102 can operate to present the one or more identified candidates to the user based in part on the input scope value or values associated with the input interface. For example, the IME 102 can operate to present one or more identified word or phrase candidates as part of a candidate window (see window 212 of FIG. 2B) in an associated device display. As described above, the IME 102 can also present candidates having different input scope values when an input interface is tagged with multiple input scope values. As an example, assume that an input interface, such as an edit control, is tagged with a "city" input scope value and a "state" input scope value. In such as case, the IME 102 can suggest city and state names from the input history data that match the text entered so far. For example, a user might enter "S" into the input interface having city and state input scope values and be presented with suggestions of "Seattle" and "South Dakota".

At 310, the user can complete and enter a string if a desired candidate is not available. For example, a user may enter a word into the input interface that was not presented in a candidate window by the IME 102. Optionally, the user can select a candidate from the one or more candidates presented by the IME 102. If the user enters a string into the input interface, at 312, the IME 102 can operate to store the string and the associated input scope value or values to the input history store 108.

If the user selects a presented candidate, at 312, the IME 102 can operate to update statistical data associated with selected candidate and input scope value or values. For example, the IME 102 can increase a probability or weighting factor associated with the selected candidate while reducing a probability or weighting factor associated with each of the unselected candidates. Accordingly, the IME 102 can use the probabilities and/or other statistical information to suggest candidates. For example, the IME 102 can suggest prefix matching candidates with higher probabilities before suggesting prefix matching candidates having lower probabilities. Accordingly, candidates with higher probabilities can be presented higher in a list of suggest candidates in a candidate interface.

Figure 4:
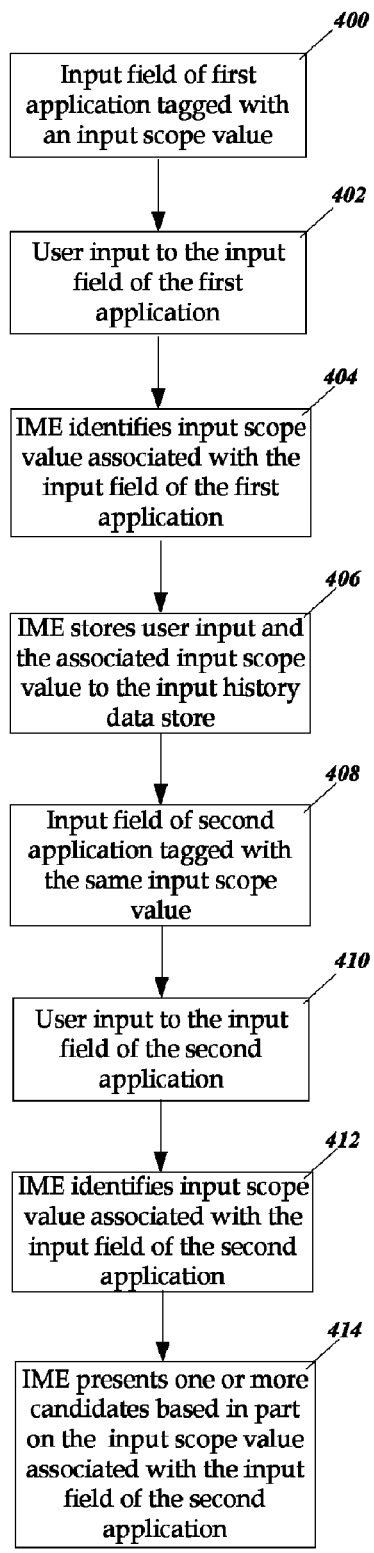
FIG. 4 is a flow diagram that illustrates an example of using an IME in conjunction with a plurality of applications to present one or more candidates to a user based in part on an input scope value.

FIG. 4 is a flow diagram illustrating a process of presenting one or more candidates in a second application based in part on input to a first application, under an embodiment. Again, the components of FIG. 1 are used in describing the flow diagram of FIG. 4, but the embodiment is not so limited. The functionality of the IME 102 can be linked to each application. For example, a dynamic link library can be associated with the IME 102 and linked to each application.

At 400, an input field of a first application is tagged with an input scope value. For example, a developer or other user can use an API to tag the input field with an appropriate input scope value. An API can also be used to associate a plurality of input fields with an input scope class. An example API to tag an input field with an input scope value is as follows:

```
HRESULT SetInputScope(
    [in] HWND hwnd,
    [in] InputScope inputscope
);
```

The new input scope value replaces any previously set input scope value for an associated input field.

Another example API that can be used to tag an input field with one or more input scope values is as follows:

```
HRESULT SetInputScopes(
    [in] HWND hwnd,
    [in] const InputScope *pInputScopes,
    [in] UINT cInputScopes,
    [in] LPCWSTR *ppszPhraseList,
    [in] UINT cPhrases,
    [in] WCHAR *pszRegExp,   //Reserved, NULL
    [in] WCHAR *pszSRGS //Speech recognition grammar rules
);
```

At 402, a user inputs and enters data in the input field of the first application. For example, a user may enter an email address as part of a login operation to a login field of an application. At 404, the IME 102 operates to identify the input scope value associated with the input field. For example, the IME 102 can use an API to identify the input scope value of an associated input field. An example API to identify an input scope value or multiple input scope values of an input field or fields is as follows:

```
HRESULT GetInputScopes(
    [in] HWND hwnd,
    [out] InputScope **pprgInputScopes,
    [out] UINT *pcCount
);
```

The API can operate to return a default input scope value if the input field has no currently assigned input scope value or values.

At 406, the IME 102 operates to store the entered data and the associated input scope value or values to the input data history store 108. At 408, an input field of a second application is tagged with the same input scope value that was tagged to the input field of the first application. As described above, an API can be used to tag the input field of the second application with one or more input scope values. At 410, the user inputs data to the input field of the second application. For example, a user may use soft keys of a keypad to enter one or more alphanumeric characters in the input field of the second application.

At 412, the IME 102 operates to identify one or more input scope values that may be associated with the input field currently being used by the user. As described above, the IME 102 can use an API to identify one or more input scope values associated with the input field having focus. At 414, the IME 102 can use the prediction component 104 and the one or more identified input scope values associated with the input field of the second application to present one or more candidates to the user using data stored in the input history store 108 which now includes the data entered into the input field of the first application.

As described above, the IME 102 can refine the presentation of candidates by only presenting candidates which have the proper input scope value or values determined at 412. Correspondingly, the IME 102 is operable to present the most relevant candidates to the user for selecting without having the user enter the entire candidate string, thereby also reducing the number of input operations. The presentation of the one or more candidates can be further tuned according to an associated predictive functionality of the prediction component 104.

While a certain order and number of operations are described with respect to FIGS. 3 and 4, the order and/or number of operations can be changed according to a desired implementation. Accordingly, other embodiments are available.

Exemplary Operating Environment

Figure 5:
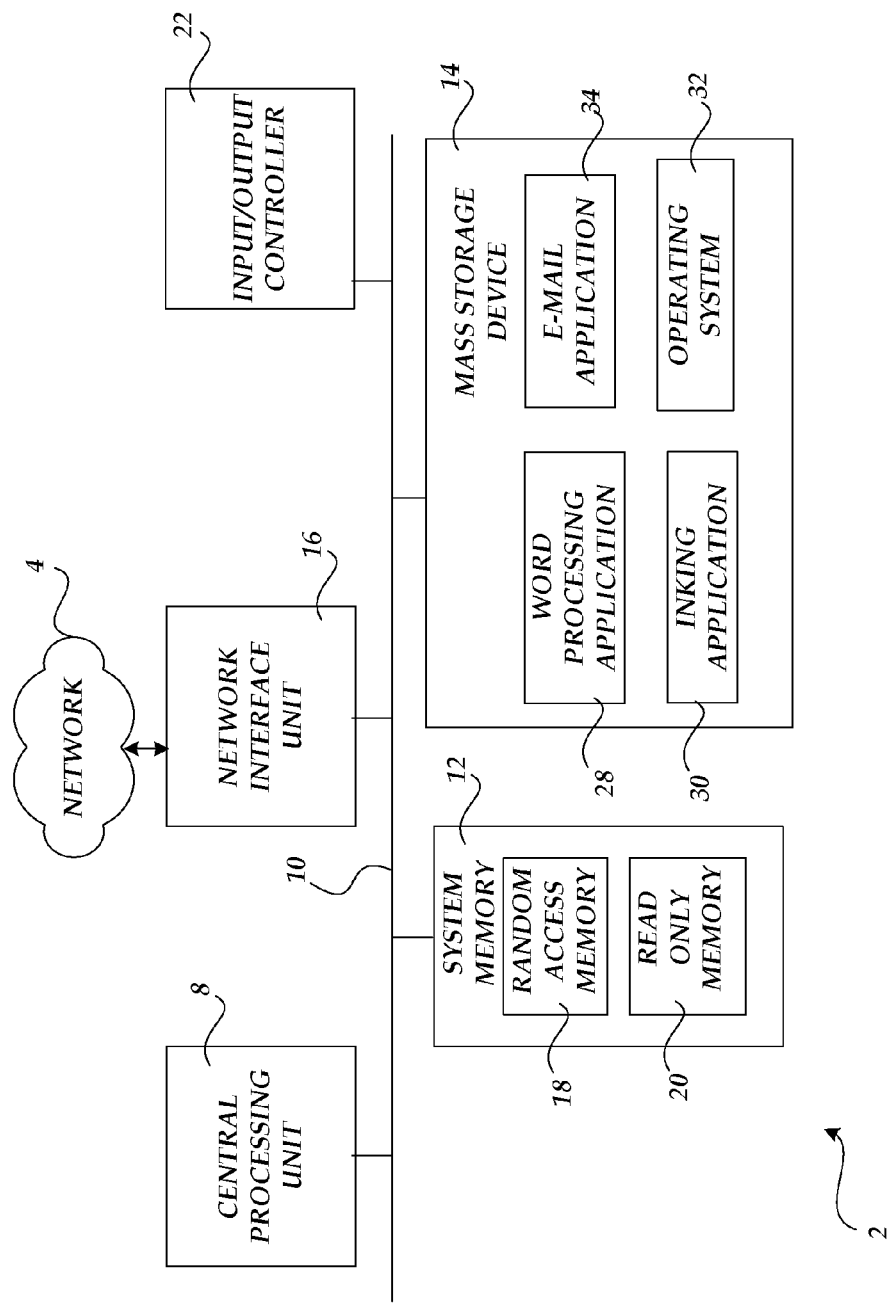
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM"), a read-only memory ("ROM") 20, a textual store 25, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computer 2, including an operating system 32 suitable for controlling the operation of a networked personal computing device, such as the WINDOWS operating systems from MICROSOFT CORPORATION of Redmond, Wash. for example. The mass storage device 14 and RAM 18 may also store one or more program modules. In particular, the mass storage device 14 and the RAM 18 may store other application programs, such as a word processing application 28, an inking application 30, e-mail application 34, drawing application, browser application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system to provide one or more candidates comprising:
 a memory component including:
   an input history store having stored input data and input identifiers associated with the input data that comprise input scope values; and,
 an input method editor (IME) in communication with the memory component, the IME including:
   a prediction component operative to identify one or more potential candidates stored in the memory component based in part on zero or more input characters and a prediction determination, wherein the IME is operative to identify the one or more candidates from the one or more potential candidates based in part on an input identifier associated with an input interface currently in use.

2. The system of claim 1, wherein the prediction component is further operative to predict the one or more potential candidates by identifying one or more prefix matching candidates based in part on one or more input characters and a prefix matching operation.

3. The system of claim 1, wherein the IME is further operative to present the one or more candidates in a candidate interface associated with an application input field.

4. The system of claim 3, wherein the IME is further operative to present the one or more candidates associated with a first input field of a first application based in part on an input to a second input field of a second application, wherein the first input field includes an identical number and type of input scope values as the second input field or a superset of the input scope values that are associated with the second input field.

5. The system of claim 1, wherein the memory component further includes a fixed data store having one or more fixed data sets, and a dictionary, wherein the IME is further operative to suggest the one or more candidates from the fixed data store and the dictionary.

6. The system of claim 1, wherein the IME is further operative to use an application programming interface (API) to identify one or more input scope values associated with an application input field.

7. The system of claim 1, wherein the IME is further operative to use an API to identify an input scope class associated with a plurality of application input fields.

8. The system of claim 7, wherein the IME is further operative to automatically populate the plurality of application input fields with one or more presented candidates using a class instance stored in the input history store.

9. The system of claim 1, wherein the IME is further operative to store an input string to the input history store with a default input scope when an input field includes a plurality of associated input scope values.

10. The system of claim 1, wherein the IME is further operative to store an input string to the input history store with a collection of input scope values when an input field includes a plurality of associated input scope values.

11. The system of claim 1, wherein the IME is further operative to store a collection of input strings to the input history store as an instance of an input scope class when an input form includes a plurality of input fields, and where each input field is assigned one or more input scope values according to an input scope class definition.

12. The system of claim 1, further comprising an application having one or more input fields, wherein each input field includes one or more associated input scope values.

13. A computer readable storage medium including executable instructions which, when executed, present one or more candidates by:
receiving user input to a first input interface of a first application;
identifying an input identifier associated with the first input interface of the first application;
storing the user input and the identified input identifier including an entered string with a plurality of input scope values associated with an input field;
receiving user input to a second input interface of a second application;
identifying an input identifier associated with the second input interface of the second application;
predicting one or more candidates based in part on a prediction model, the user input to the second input interface and previously stored input data; and,
suggesting one or more candidates from the one or more predicted candidates based in part on the identified input identifier associated with the second input interface.

14. The computer readable storage medium of claim 13, wherein the instructions, when executed, are further operative to identify an input scope class associated with a plurality of input fields.

15. The computer readable storage medium of claim 14, wherein the instructions, when executed, are further operative to automatically populate the plurality of input fields with an instance of the identified input scope class based in part on a selection of the one or more presented candidates.

16. A method of suggesting one or more candidate strings based in part on a user input, the method comprising:
defining an input scope class that includes a plurality of input scope values for a plurality of input fields;
determining an input scope value associated with an input interface;
identifying one or more prefix matching candidate strings using zero or more characters input to the input interface;
filtering the one or more prefix matching candidate strings based in part on the input scope value to identify the one or more candidate strings; and,
presenting the one or more candidate strings in a candidate interface.

17. The method of claim 16, further comprising storing an entered string and the associated input scope value to storage for use in subsequent prediction operations.

* * * * *